United States Patent
Nomiyama et al.

(10) Patent No.: US 6,911,978 B2
(45) Date of Patent: Jun. 28, 2005

(54) INFORMATION PROCESSING SYSTEM, INFORMATION PROCESSING METHOD, COMPUTER PROGRAM, STORAGE MEDIUM, AND PROGRAM TRANSMISSION APPARATUS

(75) Inventors: Hiroshi Nomiyama, Kawasaki (JP); Koichi Takeda, Machida (JP)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 10/000,748

(22) Filed: Oct. 24, 2001

(65) Prior Publication Data

US 2003/0076323 A1 Apr. 24, 2003

(51) Int. Cl.[7] .............................. G06T 11/20
(52) U.S. Cl. .................. 345/440; 715/700; 715/762; 715/763
(58) Field of Search .................. 345/440, 700, 345/762, 763, 764; 715/762–764, 700

(56) References Cited

U.S. PATENT DOCUMENTS

| | | | | |
|---|---|---|---|---|
| 5,414,809 A | * | 5/1995 | Hogan et al. | 345/765 |
| 5,515,488 A | * | 5/1996 | Hoppe et al. | 345/440 |
| 5,522,022 A | * | 5/1996 | Rao et al. | 345/440 |
| 5,701,456 A | * | 12/1997 | Jacopi et al. | 707/4 |
| 5,847,972 A | * | 12/1998 | Eick et al. | 709/246 |
| 2001/0056498 A1 | * | 12/2001 | Kohda et al. | 709/238 |
| 2002/0175918 A1 | * | 11/2002 | Barber | 345/474 |

* cited by examiner

*Primary Examiner*—Matthew C. Bella
*Assistant Examiner*—Po-Wei (Dennis) Chen
(74) *Attorney, Agent, or Firm*—Ronald L. Drumheller; Richard M. Goldman

(57) ABSTRACT

It is an object of the present invention to prepare information that is defined by a search query and the act of collecting and analyzing the information for a specific purpose, and to provide new information collection and analysis means for the management of knowledge. An information processing system includes: a data knowledge request processor and a data knowledge request log, for obtaining a log for operations performed during information processing; a knowledge search processor, for setting, as nodes on a graph, the operations of the log obtained by the data knowledge request processor and the data knowledge request log, and for connecting the nodes with arcs in the order of the performance of the operations to prepare a graph that represents a transient condition wherein the operations are shifted; and a knowledge synthesis/display processor, for visually presenting the graph prepared by the knowledge search processor.

12 Claims, 14 Drawing Sheets

Preparation of information flow graph

Information processing using radar chart

INFORMATION PROCESSING SYSTEM, INFORMATION PROCESSING METHOD, COMPUTER PROGRAM, STORAGE MEDIUM, AND PROGRAM TRANSMISSION APPARATUS

BACKGROUND

1. Field of the Invention

The present invention relates to an information processing method for describing, in a graph that can be visually evaluated, an information search process and its transient condition, and for supporting the evaluation and processing of the graph.

2. Related Art

Recently, as people have come to realize how important knowledge management is to a business, "knowledge" for fully utilizing information, means for "correlating" information and a systematic method for "tracking correlation" have been requested, and for these objects various methods have been proposed.

Conventional techniques represent and manage the information utilization method, from the viewpoint of database transactions and work flow. Specifically, well known methods are available that employ description languages (e.g., UML) to describe processes using graphs, and methods for storing search sequences in a database system as routine processes.

These methods have as their main objects the acquisition of knowledge concerning procedures and the intercorrelation of procedural information, and in the analysis processes performed using these methods, only procedural differences are detected. For example, when the UML language is employed, procedures for the processing of information are described, and even when the object and target data are similar, due to procedural differences, information utilization methods tend to be represented by completely different graphs.

As is described above, a conventional technique that provides "knowledge" for managing information, means for "correlating" different items of information with each other, and a systematic method for "tracking correlation" are provided from the viewpoint of the database transactions and work flow. As a result, it was difficult to share knowledge with others and to re-use knowledge.

To write a process in a description language, such as the UML, the procedures for "how to" handle information are written as is described above. In other words, the description of the information itself, i.e., "what" is to be searched for and analyzed, is not the main object. Therefore, even when the object and the target data are similar, the processes tend to be represented by completely different graphs due to procedural differences, and it is extremely difficult to search for and re-use a similar graph.

Further, according to a method whereby a process sequence for a database search is stored as a routine process for a system, merely the naming is available for the routine process, and the sharing of knowledge with others and the re-use of the knowledge are difficult.

SUMMARY OF THE INVENTION

It is, therefore, one object of the present invention to prepare information that is defined by a search query and the act of collecting and analyzing the information for a specific purpose, and to provide new information collection and analysis means for the management of knowledge.

It is another object of the present invention to implement a knowledge expression with which it is easy to identify similarities between graphs whereby information and the act of collecting and analyzing it are described, and to make it possible to re-use a graph that has been prepared.

To achieve the above objects, according to the present invention, an information processing system with the following configuration is provided. Specifically, the information processing system comprises: log acquisition means, for obtaining a log for operations performed during information processing; graph preparation means, for setting, as nodes on a graph, the operations of the log obtained by the log acquisition means, and for connecting the nodes with arcs in the order of the performance of the operations to prepare a graph that represents a transient condition wherein the operations are shifted; and graph display means, for visually presenting the graph prepared by the graph preparation means.

A variety of information processing operations are performed to provide the log and to prepare the graph. In particular, these operations can be those whereby, during a database search, data are narrowed down by changing the item searched for or the search conditions, and the desired data is obtained by repeating the search.

The information processing system further comprises: graph storage means, for storing the graph that is prepared; and search means, for searching for the graph stored in the graph storage means using, as a search key, an arbitrary node or arc, or a path consisting of a sequence of nodes and arcs. In this case, the graph display means can display the graph detected by the search means.

The information processing system further comprises: graph editing means, for editing the prepared graph by dividing the graph at an arbitrary location and connecting an arbitrary node to an arbitrary arc. In this case, the graph display means can display a graph edited by the graph display means.

It is preferable that a GUI be used for the editing operation, and that a pointing device or a keyboard be employed while referring to the displayed graph. An editing function that is mounted using conventional graphic software can be employed as means for implementing the GUI operation.

The information processing system further comprises: information processing means, for employing the graph as a script, and for mechanically performing operations specified at the nodes of the graph in the order indicated by the arcs in the graph.

This configuration is preferable because once a user prepares a graph for his or her operation, the operation can be performed automatically in accordance with the graph.

The information processing system further comprises: radar chart preparation means, for arranging operations for information processing around the circumference of a circle and preparing a radar chart that represents conditions for the operations using distances from the center of the circle, and for arranging and displaying the nodes of the graph at predetermined locations on the radar chart; and list preparation means, for preparing a list wherein the nodes on the radar chart are correlated with the results obtained by operations corresponding to the nodes.

This configuration is preferable because the results of operations can be evaluated in detail using the radar chart.

Further, according to the present invention, an information processing system having the following configuration can be provided. Specifically, the information processing system comprises: database search means, for searching a data base for desired data; display means, for displaying search results obtained by the database search means; radar chart preparation means, for arranging operations for a data search around the circumference of a circle and preparing a radar chart that represents conditions for the operations using distances from the center of the circle, and for arranging and displaying a node at a location on the radar chart that corresponds to the search result obtained by the database searching means; and list preparation means for preparing a list wherein the node on the radar chart is correlated with data obtained by the database search means.

The information processing system further comprises: interface means, for moving, in the radial direction of the radar chart, the node on the radar chart that is displayed by the display means and for positioning the node at an arbitrary position, so as to permit the database search means to search the database under a condition indicated by the location on the radar chart, and to permit the list preparation means to prepare a list that reflects the search results.

According to the present invention, an information processing method, whereby transient conditions for an information processing operation are written using a descriptive form that enables the transient conditions to be visually evaluated, comprises the steps of: setting up the information processing operation as nodes in the descriptive form; setting the execution order of the information processing operations using arcs to be extended from node to node; and connecting the nodes using the arcs to write the transient conditions using the descriptive form so that the transient conditions can be visually evaluated.

For this invention a variety of operations for information processing can be written. In particular, these operations can be those where, during a database search, data choices are narrowed down by changing a search item or a search condition, and the search is repeated to obtain desired data.

The information processing operations are those for searching a database for desired data, and each of the operations corresponding to the nodes corresponds to a query having a predetermined form.

A general-purpose query, such as an SQL query or a request for a full-text search, can be employed for a search.

Further, a transient condition concerning the information processing operations between nodes before and after each of the arcs is written as an annotation, in an arbitrary expression, by a user and the annotation is added to the arcs.

According to the present invention, an information processing method having the following configuration can be provided. Specifically, the information processing method comprises the steps of: obtaining a log for operations performed during information processing; setting, as nodes on a graph, the operations recorded in the log, and connecting the nodes with arcs, in the order in which the operations are performed, to prepare a graph representing a transient condition wherein the operations are shifted; and visually presenting the prepared graph.

The information processing method further comprises the steps of: storing and accumulating the graph that are prepared; searching for a different graph that includes all or part of a predetermined graph representing a predetermined operating sequence, and that has a node corresponding to a preceding or succeeding operation; and adding, to the predetermined graph, the node that corresponds to the preceding or succeeding operation of the common portion of the different graph, and an arc directing to the node.

With this configuration, conventional graphs can be combined to obtain a graph corresponding an operation that corresponds to the object of the user.

The information processing method further comprises the steps of: storing and accumulating graphs that are prepared; searching for graphs that correspond to an operating sequence whereby predetermined operating results are available; and selecting a desired graph from among the graphs obtained by the search, and connecting the desired graph to a graph that corresponds to another operation for which the results obtained through an operation consonant with the desired graph are employed.

This configuration is preferable because when a plurality of types of operating sequences are used to obtain predetermined results, the most efficient procedures that match the object of the user can be obtained.

The information processing method further comprises the step of: arranging operating items for information processing around the circumference of a circle and preparing a radar chart that represents conditions for the operations using distances from the center of the circle, and arranging and displaying the nodes of the graph at predetermined locations on the radar chart.

Since the graph is projected onto the radar chart, the operations can be evaluated in detail.

According to the present invention, a computer program that permits a computer to perform the following processes can be provided. Specifically, the computer program permits a computer to perform: a process for obtaining a log for operations during information processing; a process for setting, as nodes on a graph, the operations recorded the obtained log, and for connecting the nodes with arcs in the order of the performance of the operations to prepare graphs that represent a transient condition wherein the operations are shifted; a process for accumulating the graphs that are prepared; a process for searching for a desired graph using, as a search key, an arbitrary node or arc, or a path consisting of a sequence of nodes and arcs; a process for editing the graph that is prepared or the desired graph that is obtained by the search; and a process for visually presenting the graph provided by editing.

According to the present invention, a storage medium can be provided on which input means of a computer stores a computer-readable program, and further, a program transmission apparatus can be provided that reads this computer-readable program from the storage means.

DESCRIPTION OF THE PREFERRED EMBODIMENTS

The preferred embodiment of the present invention will now be described in detail while referring to the accompanying drawings.

The overview of the present invention will now be described. In this invention, an information flow graph is proposed wherein information and its utilization and correlation are written. The information flow is a model that describes a target information source, a series of search forms that are used for a determination or to characterize important information, and the employment of the decision or a filter. An analysis of the information is defined as a node, and the node is represented by a graph, including arcs that have branch conditions or transient condition. When such a data structure is employed, the performances of information analyses and information utilization can correspond to graphs that represent information flow having the individual shapes.

Therefore, an information flow graph can be used for the following objects.

1. The periodical interpretation of a description is performed, and information that satisfies the description is extracted, or an analysis of the information is distributed to a user.
2. The search for and re-use of multiple results obtained through analysis or utilization of information based on the same type of information.
3. The synthesis of graphs to perform information analysis and information utilization at a higher level. Since the information flow graph is employed for the above object, how to utilize the information can be shared with an organization or users. Further, since the information flow graph is collectively processed, a large problem encountered in knowledge management, such as efficiently coping with an information request or the designation of an information resource that serves as the nucleus of the organization, can be resolved. Further, since the information flow graph represents only target information, i.e., "what" is to be searched for or analyzed, to search for a similar graph and to re-use of the graph is easy, and the knowledge expression is easy to understand by another user.

The information flow graph will now be described in more detail. The information flow graph is a directed graph representing an information request by a user and that includes nodes, each of which indicate an information search form, and arcs that represent conditional branches and cases. When the search results obtained immediately before are employed to narrow down information or to re-use information, the two nodes for the search results are connected by an arc. In addition, the information flow graph can be interpreted as a script for collecting and searching for a series of relating information. Therefore, when the user designates the information flow graph as a script, the system can periodically execute the procedures written in the information flow graph.

Figure 1:
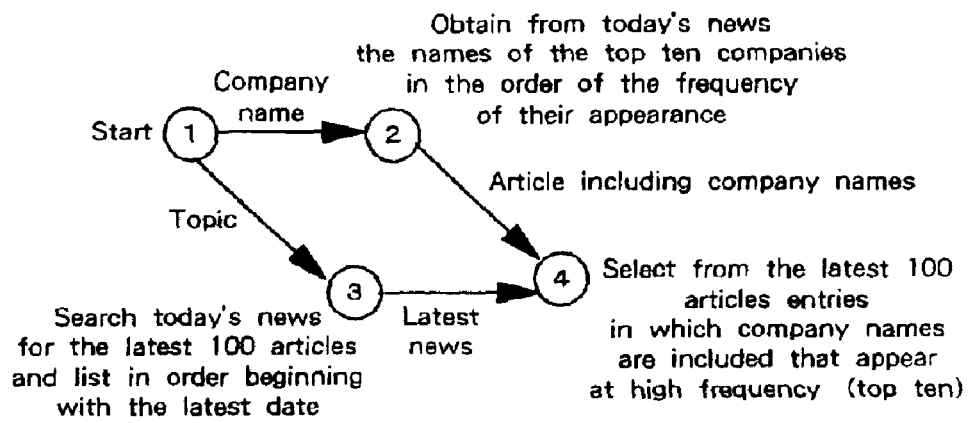
FIG. 1 is a diagram showing an example information flow graph used for one embodiment of the present invention.

FIG. 1 is a diagram showing an example information flow graph.

In FIG. 1, when a start node (hereinafter referred to as node 1) is the origin, two routes are shown that lead to a node 4 whereat an information request to "select, from the latest 100 articles, articles that include company names (the top ten) that appeared frequently" is written. One route advances from node 1 to node 4 via a node 2, whereat an information request to "obtain from today's news the names of the top ten companies in the descending order of the frequency of their appearance" is written. The other route advances from node 1 to node 4 via a node 3, whereat an information request to "search today's news for the latest 100 articles and list in order beginning with the latest date" is written. That is, it is apparent that to obtain the information represented at node 4, there is a method according to which the procedure at node 2 is performed first and then the top ten company names that are obtained are used to perform the procedure at node 4, and a method according to which the procedure at node 3 is performed first and then the 100 articles that are obtained are used to perform the procedure at node 4.

It should be noted that the information requests written as remarks in FIG. 1 ("obtain from today's news the names of the top ten companies in the descending order of the frequency of their appearance" and "search today's news for the latest 100 articles and list in order beginning with the latest date") are actually supposed to be expressed by using a predetermined search format, such as an SQL query or a request that a full-text search be performed. Since a predetermined search format is employed, the appropriateness for a general-purpose application, or the usability when the information flow graph is referred to or is employed as a script can be improved. It is not always necessary for an information request to be expressed by using an SQL query or a request for a full-text search, and a user can employ an arbitrary search format to describe an information request.

An annotation that indicates a transient condition for a procedure for each node is provided for each of the arcs of the information flow graph. Specifically, an annotation "company name", which indicates the acquisition of company names at node 2, is added to the arc extending from node 1 to node 2, and an annotation "an article including a company name", which indicates the acquisition at node 4 of an article in which a company name is included, is added to the arc extending from node 2 to node 4. Similarly, an annotation "topic", which indicates the acquisition of a news article at node 3, is added to the arc extending from node 1 to node 3, and an annotation "the latest article", which indicates the acquisition at node 4 of the latest article, is added to the arc extending from node 3 to node 4.

An information request written at a node describes the procedure that is actually to be performed, while an annotation added to an arc indicates the reason for which the procedure is to be performed. Therefore, although an arbitrary annotation may be provided by a user, such an annotation need not always be furnished.

The evaluation and the processing of the information using the thus arranged information flow graph can be employed not only to provide a description of the operations performed for the database in accordance with the information requests, but also to provide a description of the various operations that are employed for information processing and of the evaluation and the processing of the information.

An explanation will now be given for an information flow graph control system according to the embodiment that prepares and processes the above described information flow graph.

Figure 2:
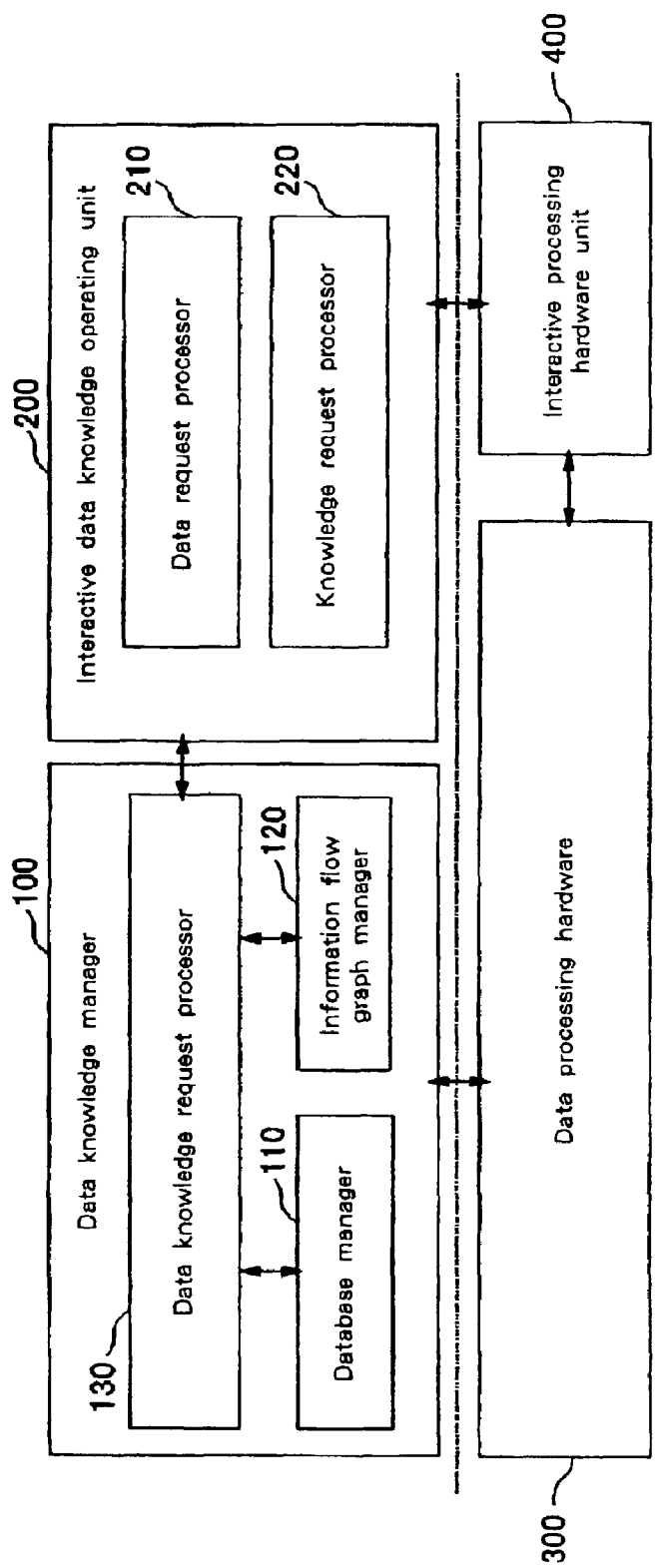
FIG. 2 is a diagram for explaining the configuration of an information flow graph control system according to the embodiment.

FIG. 2 is a diagram showing the configuration of the information flow graph control system according to the embodiment.

In FIG. 2, a data knowledge manager 100 holds an information flow graph and a database for performing data processing. An interactive data knowledge operating unit 200 provides an interactive interface to search for or to process data or knowledge. A data processing hardware unit 300 performs internal data processing. And an interactive processing hardware unit 400 presents information to and accepts requests from a user.

In the actual system, the data knowledge manager 100, which is virtually provided by software for the data processing hardware unit 300, and the interactive data knowledge operating unit 200, which is virtually provided by software for the interactive processing hardware unit 400, process information using the information flow graph.

Figure 3:
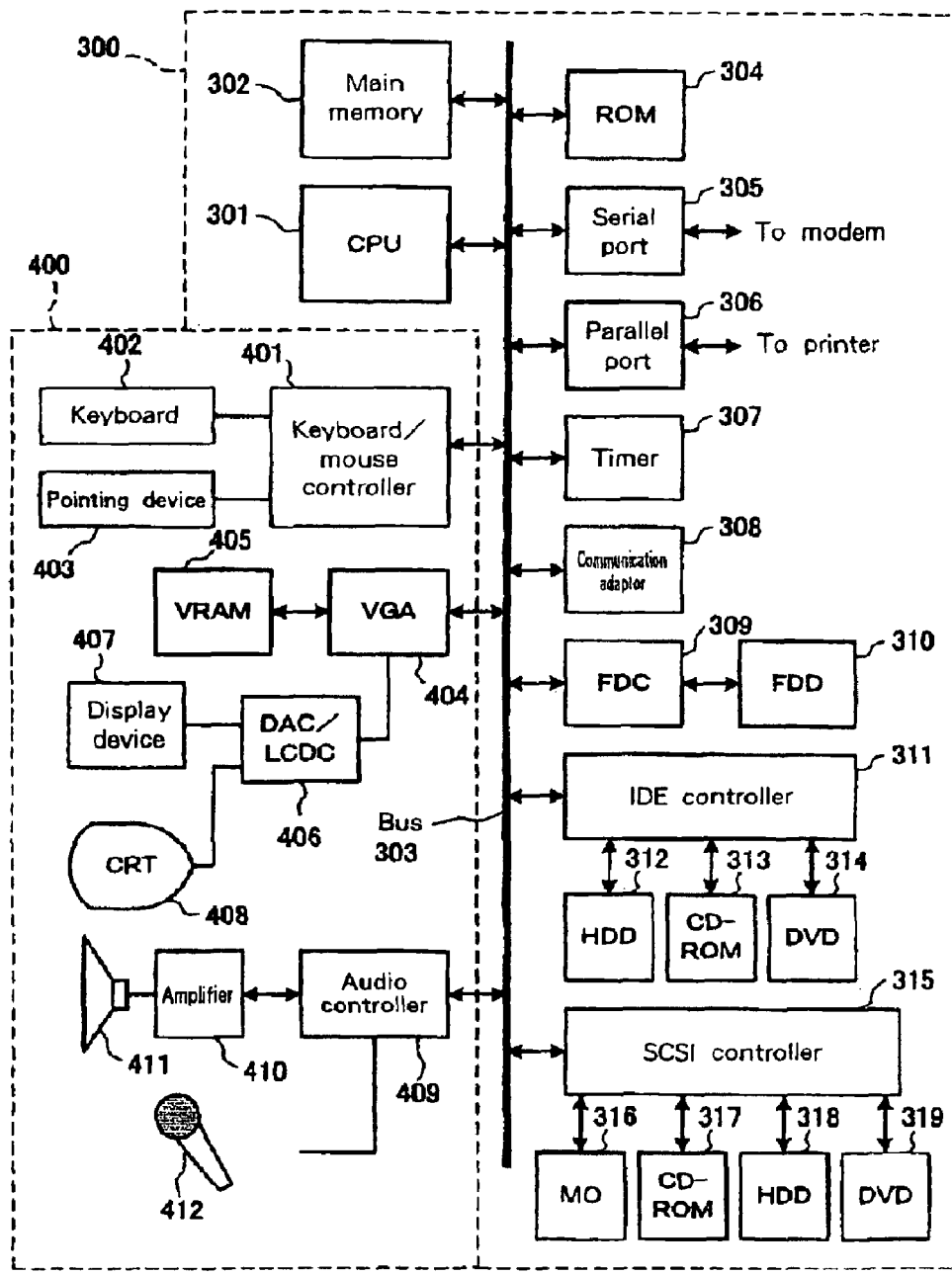
FIG. 3 is a detailed diagram for explaining a data processing hardware unit and an interactive hardware unit that constitute the hardware blocks of the information flow graph control system in FIG. 2.

FIG. 3 is a detailed diagram for explaining the arrangement of the data processing hardware unit 300 and of the interactive processing hardware unit 400, which are the two hardware blocks provided for the information flow graph control system in FIG. 2.

In FIG. 3, the data processing hardware unit 300 includes a central processing unit (CPU) 301 for performing calculations and a main memory 302. The CPU 301 and the main memory 302 are connected to various auxiliary storage devices via a bus 303 and either an IDE controller 311 or a SCSI controller 315. The auxiliary storage devices are hard disk drives (HDDs) 312 and 318, and drives for storage media, such as CD-ROMs 313 and 317, DVDs 314 and 319 and an MO 36. A floppy disk drive (FDD) 310 is also connected via a floppy disk controller (FDC) 309 to the bus 303.

A floppy disk is loaded into the floppy disk drive 310. Computer programs, which interact with an operating system and which, to implement the embodiment, issue commands to the CPU 301, or code or data for an operating system can be stored on the floppy disk, the hard disk drives 312 and 318, the CD-ROMs 313 and 317 and the DVDs 314 and 319, as well as in a ROM 304. When these computer programs are loaded into the main memory 302, the processes in the embodiment, which will be described later, are performed. The code for the computer programs may be compressed or may be divided into multiple code segments, and the resultant code segments recorded on multiple storage media. The programs or the code segments may be recorded on a storage medium, such as a floppy disk, which can then be loaded into another computer.

A printer or a modem can be connected to the bus 303 via a parallel port 306 or a serial port 305, and the complete system can be connected to a network via the serial port 305 and the modem, or via a communication adaptor 308 (the ethernet or a token ring), thereby enabling it to communicate with other computers or servers. And a remote transmission/reception device is connected to the serial port 305 or the parallel port 306 to exchange data using infrared rays or radio.

The interactive processing hardware unit 400 includes as input devices a keyboard 402, a pointing device (a mouse or a joy stick) 403 and a microphone 412, and includes as output devices a display device 407, a monitor (CRT) 408 and a loudspeaker 411. Preferably, the interactive processing hardware unit 400 employs the pointing device 403 to perform a requested operation for a GUI (Graphical User Interface). The keyboard 402 and the pointing device 403 are connected via the keyboard/mouse controller 401 to the bus 303 of the data processing hardware unit 300. And the display device 407 and the CRT 408 are connected to the bus 303 via a controller (DAC/LCDC) 406 and a video graphic accelerator (VGA) 404.

The audio controller 409 performs D/A (digital/analog) conversion for a sound signal or a voice signal, and transmits the resultant signal via an amplifier 410 to the loudspeaker 411, through which the signal is output as sound or as a voice. The audio controller 409 also performs A/D (analog/digital) conversion for voice information that is received through the microphone 412 so as to acquire external voice information for the system. These hardware units and the voice recognition application software may be employed for entering voice commands, instead of commands that are entered using the keyboard 402 or the pointing device 403. And the application software for voice output may be employed to read and orally reproduce information shown on the CRT 408.

It can be easily understood that the information flow graph control system in this embodiment can be implemented by using various types of computer systems, such as an ordinary personal computer (PC) or workstation, a notebook PC, a palmtop PC and a network computer; electric home appliances, such as televisions that incorporate computer systems; or combinations of such systems. These components are merely examples, and not all them are requisite components of the present invention.

Figure 4:
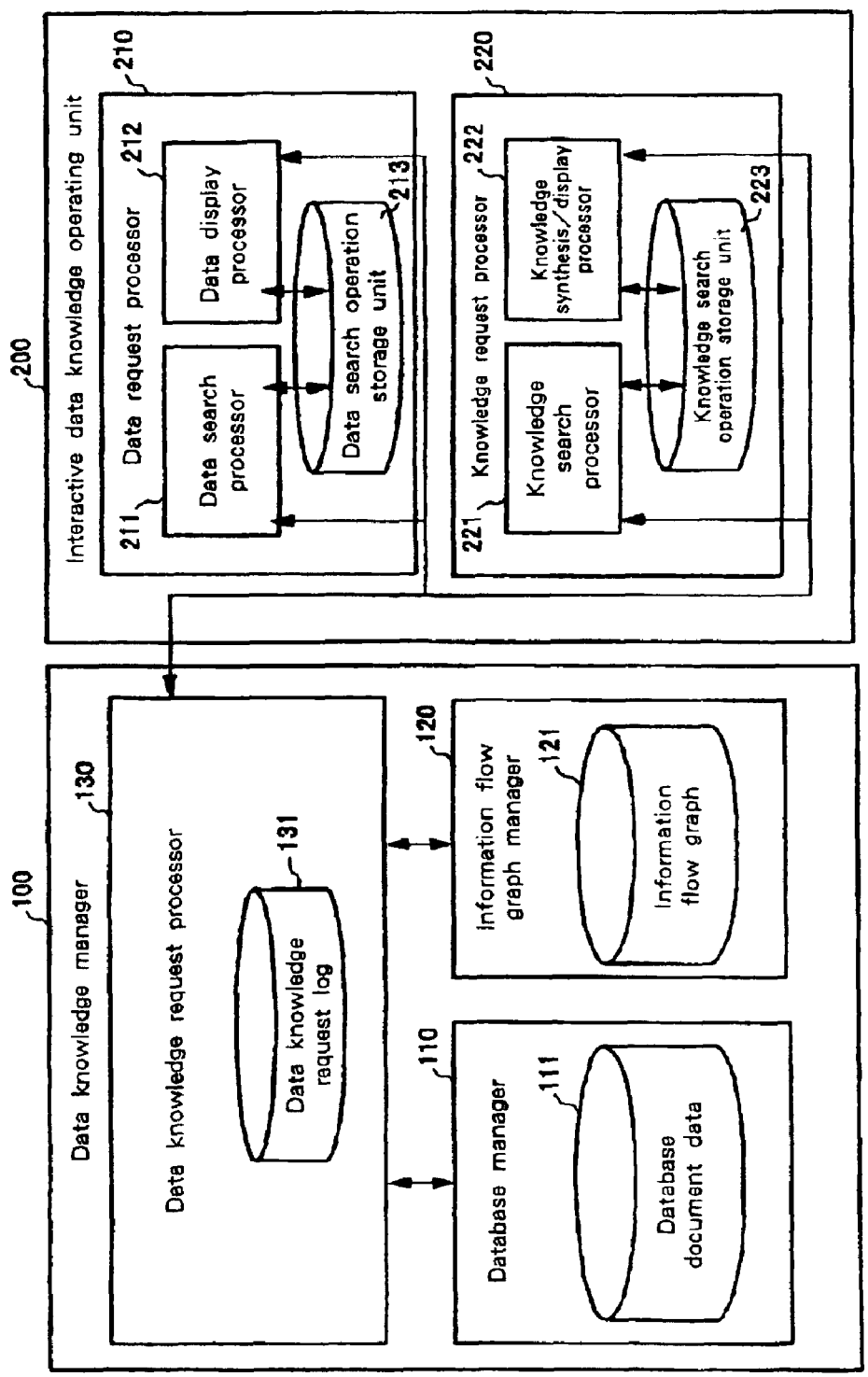
FIG. 4 is a detailed diagram for explaining the data knowledge manager and an interactive data knowledge operating unit that constitute the software blocks of the information flow graph control system in FIG. 2.

FIG. 4 is a detailed diagram for explaining the arrangements of the data knowledge manager 100 and the interactive data knowledge operating unit 200, which are software blocks that form part of the information flow graph control system in FIG. 2.

In FIG. 4, the data knowledge manager 100 includes a system database manager 110; an information flow graph manager 120, for managing the information flow graph as knowledge for using data; and a data knowledge request processor 130, for handling information requests issued by a user. The interactive data knowledge operating unit 200 includes a data request processor 210, for detecting, processing and displaying data; and a knowledge request processor 220, for searching for, processing and displaying knowledge that is represented by the information flow graph.

The data knowledge request processor 130 interprets requests transmitted from a user via the interactive data knowledge operating unit 200, for a process for searching, processing and displaying data using the information flow graph. Then, the data knowledge request processor 130 transmits the received requests to the database manager 110 or the information flow graph manager 120, and receives the results obtained by the processing of the requests, following which the data knowledge request processor 130 transmits the processing results to the interactive data knowledge operating unit 200. The data knowledge request processor 130 also includes a data knowledge request log 131, in which a history of the requests accepted from the user is stored and is used to define a new information flow graph.

The database manager 110 manages database document data 111, and performs a search using a database search language, such as SQL, or performs a similarity search or a full-text search using a key word for document data. Further, the database manager 110 performs a database function, such as the addition, deletion or editing of data.

The information flow graph manager 120 performs search, addition or deletion processes for an information flow graph 121 that conveys knowledge in order to search or to synthesize a database or document data. As is described above, since the information flow graph 121 employs as a node the description of a search form, and employs as an arc the description of an annotation or a conditional branch, the information flow graph manager 120 processes a variety of search requests for the information flow graph 121, such as a search performed for a graph based on the information supplied for the node or the arc.

The data request processor 210 of the interactive data knowledge operating unit 200 includes a data search processor 211, a data display processor 212 and a data search operation storage unit 213. The data search processor 211 accepts a data search request from the user, such as an SQL query, a keyword search or a full-text search, and requests that the data knowledge request processor 130 perform the search process. When the search results are received from the data knowledge request processor 130, they are temporarily stored in the data search operation storage unit 213. Then, the data display processor 212 presents the results to the user by displaying them on the CRT 408 of the interactive processing hardware unit 400 in FIG. 3.

The data display processor 212 can display the search results so that they can be easily understood, by employing a variety of data visualization methods, such as coloring, that are generally employed for a presentation. But further, means for confirming the usefulness of the search results is provided in order to register a series of data search requests that can be usefully employed for the information flow graph. This means will be described later.

The knowledge request processor 220 includes a knowledge search processor 221, a knowledge synthesis/display processor 222 and a knowledge search operation storage unit 223. When a user searches for knowledge used for searching for or processing data, the knowledge search processor 221 accepts from the user a search request for the information flow graph, and analyzes the request. The knowledge search processor 221 then requests that the data knowledge request processor 130 perform the search based on the obtained request. Then, when the search results are returned by the data knowledge request processor 130, they are temporarily stored in the knowledge search operating storage unit 223. Thereafter, the knowledge synthesis/display processor 222 presents the search results for the user by displaying them on the CRT 408 of the interactive processing hardware unit 400 in FIG. 3.

The knowledge synthesis/display processor 222 can display the search results so that they can be easily understood by employing a graph visualization method that is generally employed for a presentation. Furthermore, a new information flow graph can be generated by synthesizing multiple information flow graphs.

An explanation will now be given for the processing performed by the data knowledge manager 100 and the interactive data knowledge operating unit 200 in the information flow graph control system according to the embodiment.

As is described above, the information flow graph 121 in this embodiment is used to write information defined by the search form, and to perform the collection and the analysis of information in accordance with a specific object. Therefore, similar information requests can be searched for and synthesized by using a difference between target information, not a conventionally employed procedural difference that is analyzed by a transaction or the work flow in the database. Thus, means can be provided for the re-use of the knowledge that is used to collect or to analyze information for knowledge management.

Specifically, processes are performed for obtaining the log for the information search and analysis procedures used to generate a new information flow graph 121, for searching conventional information flow graphs 121, and for evaluating and processing the conventional information flow graph 121. Each of these processes will now be described.

Figure 5:
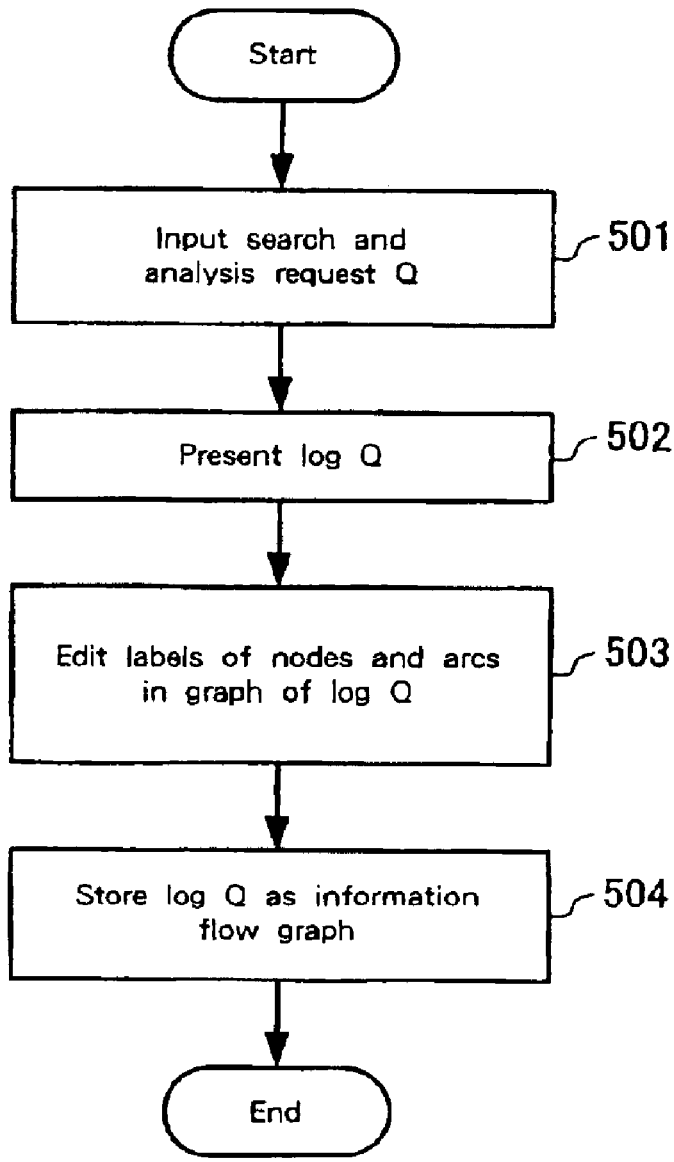
FIG. 5 is a flowchart for explaining the processing for generating a new information flow graph according to the embodiment.

FIG. 5 is a flowchart for explaining the processing performed to prepare a new information flow graph 121.

In FIG. 5, first, a search request command and an analysis request command are input to and selected by the interactive data knowledge operating unit 200, and are transmitted to the data request processor 210 (step 501). The search request is then transmitted by the data search processor 211 in the data request processor 210 to the data knowledge request processor 130 of the data knowledge manager 100, and is processed by the database manager 110. The database manager 110 returns the results obtained by the search of the database document data 111 to the data search processor 211 of the data request processor 210, where they are temporarily stored in the data search operation storage unit 213 and are displayed by the data display processor 212. While referring to the search results on the display, a user can issue a further search request or analysis request. When this process is repeated, the series of operations that are performed before the user obtains the desired results is stored as a log Q in the data knowledge request log 131.

When program control shifts to the knowledge request processor 220 of the interactive data knowledge operating unit 200, the log Q stored in the data knowledge request log 131 is read and displayed by the knowledge synthesis/display processor 222 (step 502). The log Q is displayed as a graph wherein the search forms are employed as nodes and the nodes are connected by arcs in the order in which they are executed. The user edits the log Q on the display by attaching labels to the nodes or the arcs or by modifying default labels that are provided by the system (step 503).

The log Q obtained by the editing is transmitted by the knowledge synthesis/display processor 222, via the data knowledge request processor 130, to the information flow graph manager 120, and is managed as an information flow graph 121 (step 504). When the name of the database that was searched or the search form corresponds to the node, it means that the same database was searched as during the search process performed for nodes having the same label. Therefore, in the succeeding process for searching for the information flow graphs 121, containing similar information flow graphs 121 can be effectively found by matching the nodes. Similarly, when the attribute name, the search command name or the analysis command name corresponds to the arch, similar information flow graphs 121 can be easily searched for.

Figure 6:
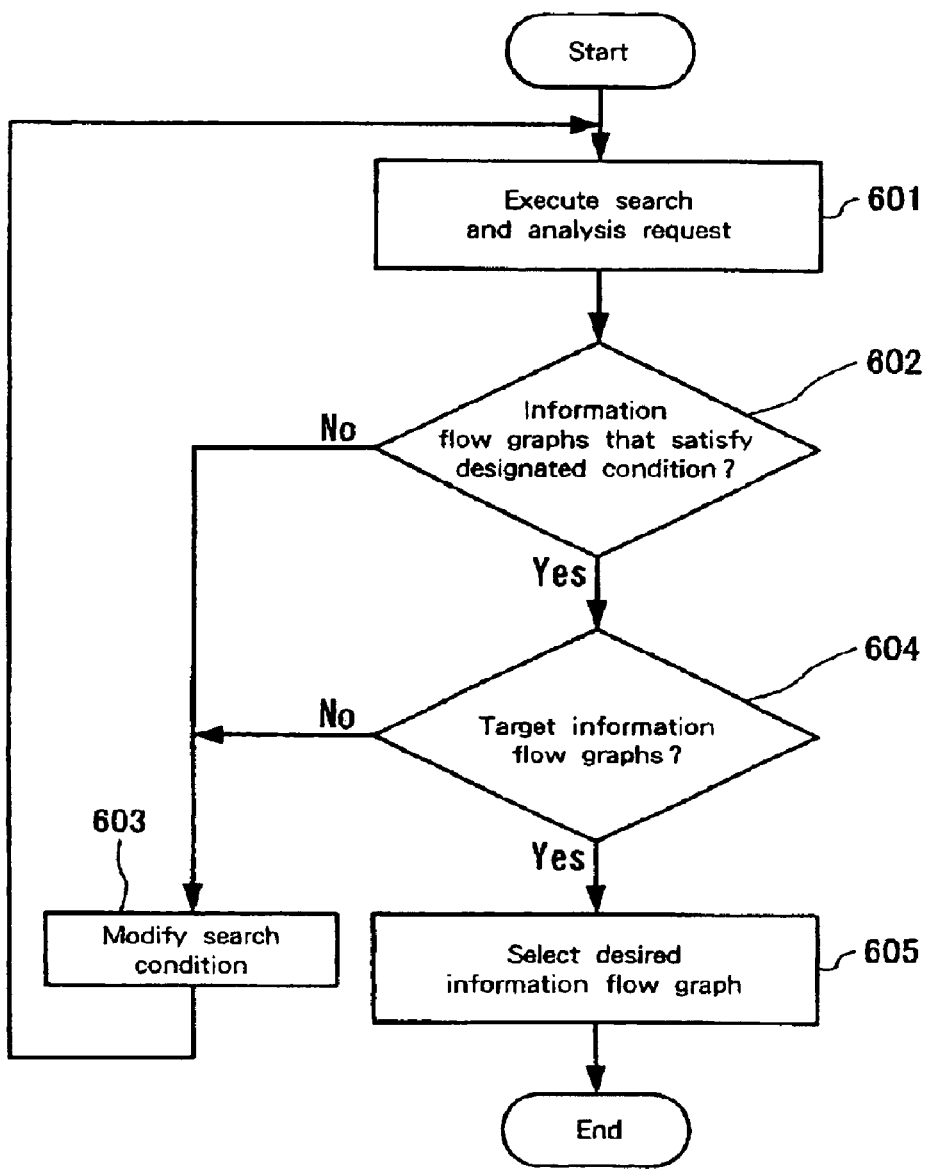
FIG. 6 is a flowchart for explaining the processing for searching for a conventional information flow graph according to the embodiment.

FIG. 6 is a flowchart for explaining the process for searching for the conventional information flow graph 121.

In FIG. 6, to search for the information flow graph 121, first, the information flow graph 121 that includes a node and an arc having specific labels is designated and is submitted to the knowledge search processor 221 as a search request. This search request is transmitted by the knowledge search processor 221, via the data knowledge request processor 130, to the information flow graph manager 120. The information flow graph manager 120 initiates the search in accordance with the search request (step 601), and reads the information flow graph 121 that matches the search condition. The information flow graph 121 is then temporarily stored in the knowledge search operation storage unit 223 of the knowledge request processor 220, and is displayed by the knowledge synthesis/display processor 222. When no information flow graph 121 is found that matches the designated search condition, a message to that effect is issued to the user. After the user modifies the search condition, a search for the information flow graph is performed again, based on under the modified search condition (steps 602 and 603).

When an information flow graph 121 is found that satisfies the designated search condition, the user determines whether the information flow graph 121 that was found is the desired one. If the obtained information flow graph 121 is not the desired graph, the search condition is modified and the search is performed again under the modified search condition (steps 604 and 603).

When the information flow graph 121 that is found is the desired one, this information flow graph 121 is selected in order that the processing or editing of that information flow graph 121 can be performed (step 605).

For the search for the information flow graph 121, even when an annotation attached to an arc is not necessarily the same, an information flow graph that matches the search condition can be found. However, the arcs that correspond to the conditional branches can be matched only under the same condition. In order to efficiently match the portions of the graphs, an effective means is to limit the search queries that can be represented by nodes. For example, the search query may be limited to only a keyword search. Since for information flow graphs 121 that have the same prefix their common portions are evaluated at the same time, and only those portions that are different are evaluated separately, a search can be performed more efficiently.

The operation for the evaluation and the processing of the information flow graph 121 will now be described.

Technically, the processing of the information flow graph 121 consists of the above described search and editing that is performed, such as the division or the connection of the information flow graph 121. However, since the information flow graph 121 describes the information collection and analysis process, multiple information flow graphs 121 that describe multiple information collection and analysis processes are evaluated or processed in accordance with a predetermined object, so that new information utilization means can be provided. For example, based on a specific search condition, a list of information flow graphs 121 that can utilize the information can be examined, and an information utilization method used by a third party can be learned. For the information utilization means, the three that follow will be explained.

1. Detailed graph generation: A single information request is reinforced by using a more detailed information request.
2. Case generation: For information requests that include common portions, information reflecting two different viewpoints are collected and analyzed.
3. Correlation: All the graph portions that include specified common nodes or specified common paths (multiple nodes and arcs connecting the nodes) are obtained.

Each process will now be described.

Generation of Detailed Information Flow Graph

Figure 7:
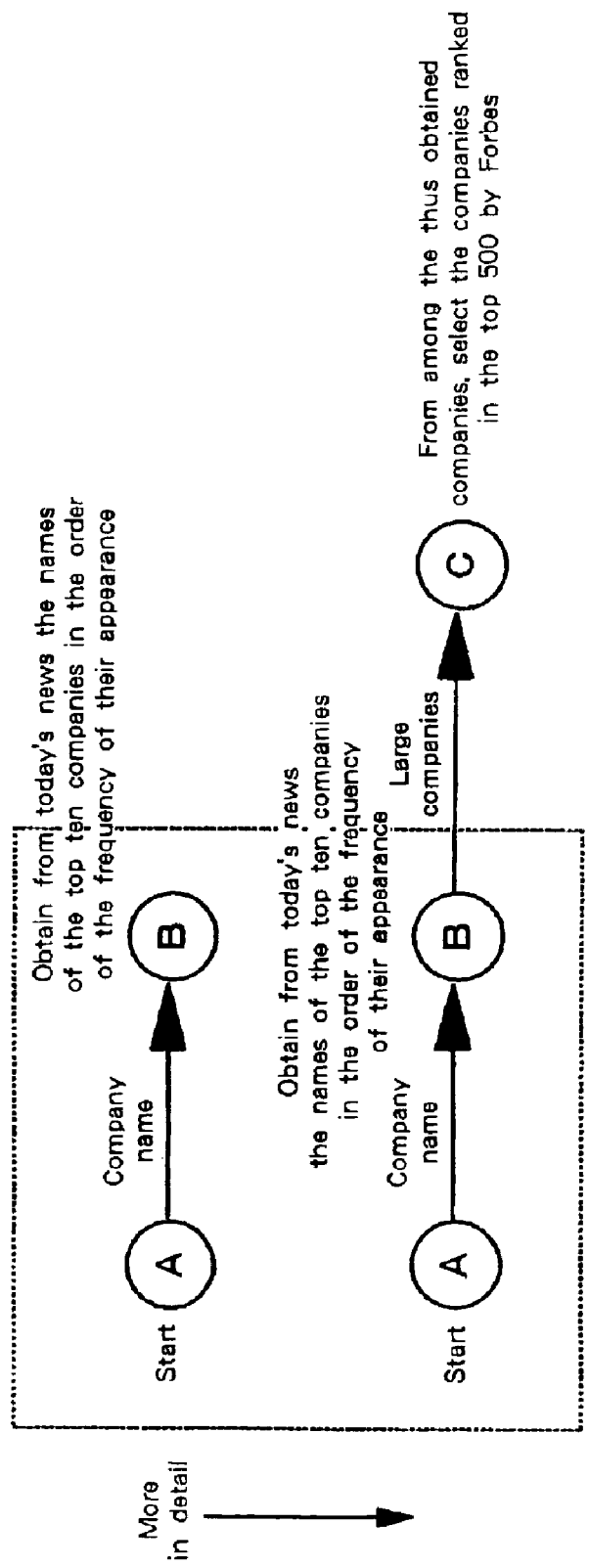
FIG. 7 is a diagram for explaining the state for generating a more detailed information flow graph according to the embodiment.

FIG. 7 is a diagram for explaining the generation of a more detailed information flow graph 121.

Assume that a user (a) performs an operation for "obtaining from today's news the names of the top ten companies in the descending order of the frequency of their appearance", and that another user (b) performs an operation for "obtaining from today's news the names of the top ten companies in the descending order of the frequency of their appearance", and from among the companies that are thus selected, "selecting companies that are ranked in the top 500 by Forbes". The operations performed by the users (a) and (b) can be written as information flow graphs a and b, as in FIG. 7. The updating from the information flow graph a to the information graph b involves the generation of a detailed information flow graph 121.

The two information flow graphs are the same for the route advancing from the start node A to the node B, whereat the information request for "obtaining from today's news the names of the top ten companies in the descending order of the frequency of their appearance" is written. However, the information flow graph b differs from the information flow graph a in that a node C is added, whereat the information request is added for "selecting companies that are ranked in the top 500 by Forbes", and an arc is extended from node B to node C.

Therefore, the user (a) can learn that a more detailed information request for "selecting companies ranked in the top 500 by Forbes" can be additionally issued after the operation he or she performed (the operation represented by the information flow graph a).

Further, before performing the operation represented by the information flow graph b, the user (b) can search for and obtain the information flow graph a that is already present, and can then efficiently acquire the information available at node B without having to resort to trial and error to obtain it. It may be difficult to understand the importance of this because the portion that the flow graphs a and b have in common in FIG. 7 is so simple to apprehend; however, for a complicated process that requires multiple operations before node B (the final node whereat information that is used in common can be obtained) is reached, the user need not rely on trial and error to repeat all the operations. As a result, this process is very effective.

Figure 8:
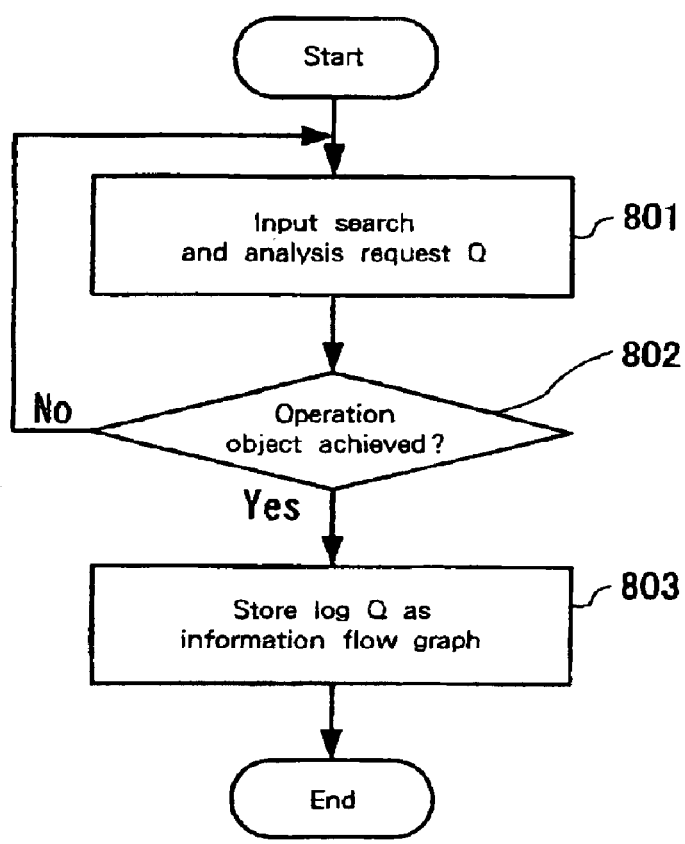
FIG. 8 is a flowchart for explaining the processing for preparing a more detailed information flow graph.

FIG. 8 is a flowchart for explaining the processing for generating a detailed information flow graph 121.

In FIG. 8, a user designates a search condition and an analysis operation that is added to the information flow graph 121 that is selected for processing (step 801). While confirming the search condition and the analysis results displayed by the data request processor 210, the user prepares a log in the same manner as one is created for a new information flow graph 121.

The search and analysis processing at step 801 is repeated until desired search or analysis results are obtained. And when the desired results have been obtained, the search and analysis processing is terminated (step 802) and the data knowledge request log 131 that is obtained is employed to prepare an information flow graph 121 that includes the results obtained by the search and analysis processing performed at step 801. Labels are then added to new arcs and nodes, and the information flow graph 121 is stored in the information flow graph manager 120 (step 803).

Case Generation of the Information Flow Graph

Figure 9:
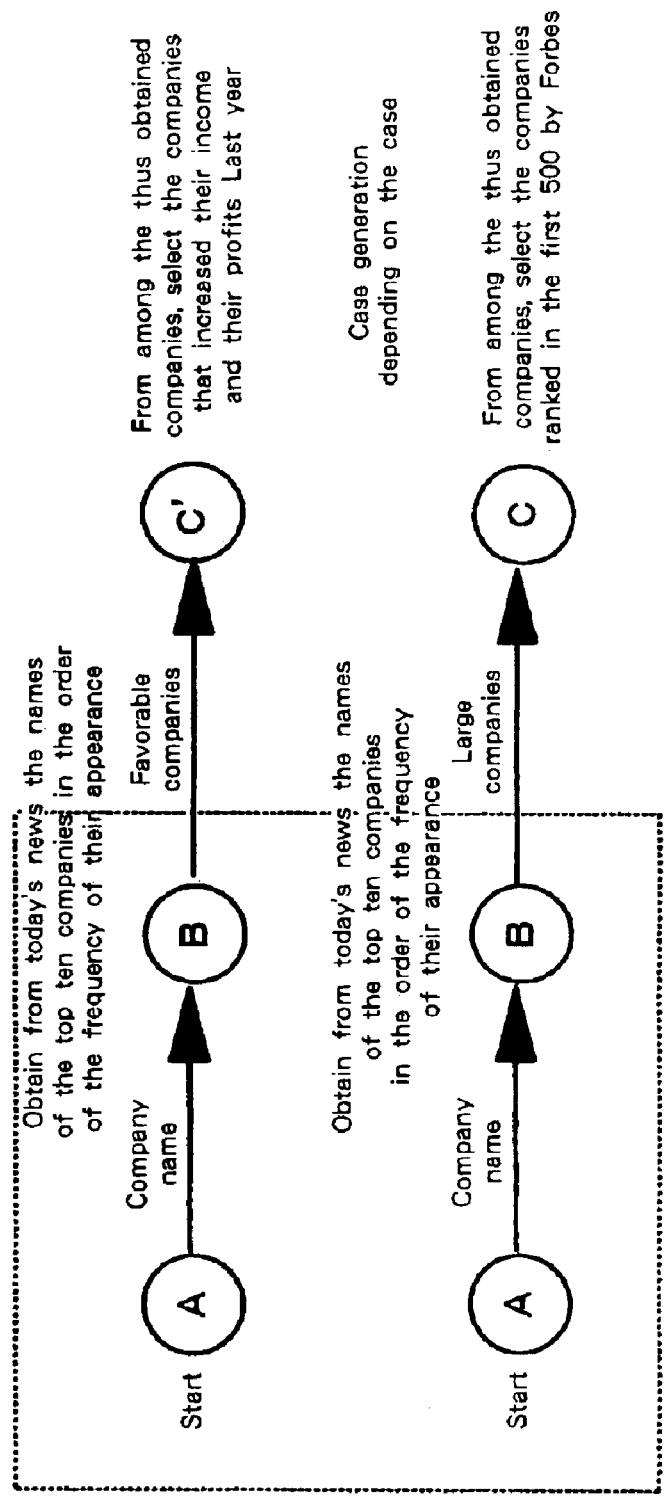
FIG. 9 is a diagram showing the state for the case generation of the information flow graph in accordance with the case.

FIG. 9 is a diagram for explaining the state wherein case generation of the information flow graphs 121 is performed in accordance with the case.

Assume a case wherein a user (a) performs an operation for "obtaining from today's news the names of the top ten companies in the descending order of the frequency of their appearance", and from the companies that are thus obtained, "selecting companies that increased their income and their profits last year"; and wherein a user (b) performs an operation for "obtaining from today's news the names of the top ten companies in the descending order of the frequency of their appearance", and from the companies that are thus selected, "selecting companies ranked in the top 500 by Forbes". The operations of the users (a) and (b) can be written as the information flow graphs a and b in FIG. 9.

The two information flow graphs are the same as the route advancing from the start node A to the node B, whereat is written the information request to "obtain from today's news the names of the top ten companies in the descending order of the frequency of their appearance". However, these graphs differ in that, in the information flow graph a, there are a node C', whereat is written the information request for "selecting companies that increased their income and their profits last year", and an arc extending from node B to node C', and that, in the information graph b, there are a node C, whereat is written the information request for "selecting companies ranked in the top 500 by Forbes", and an arc extending from node B to node C.

Therefore, the users a and b can mutually recognize that different information can be acquired by referring to an operation similar to the one they performed. The like portions of the two information flow graphs are united, and the information flow graphs that include a different portion as an arc are regarded as their own information flow graphs. Thus, based on a similar operation, more information can be obtained as needed.

Further, as well as in the generation of a detailed information flow graph, a user who performs a predetermined operation and who desires to obtain information before node B is reached can employ a different information flow graph that, in accordance with the case, is searched for during the case generation.

Figure 10:
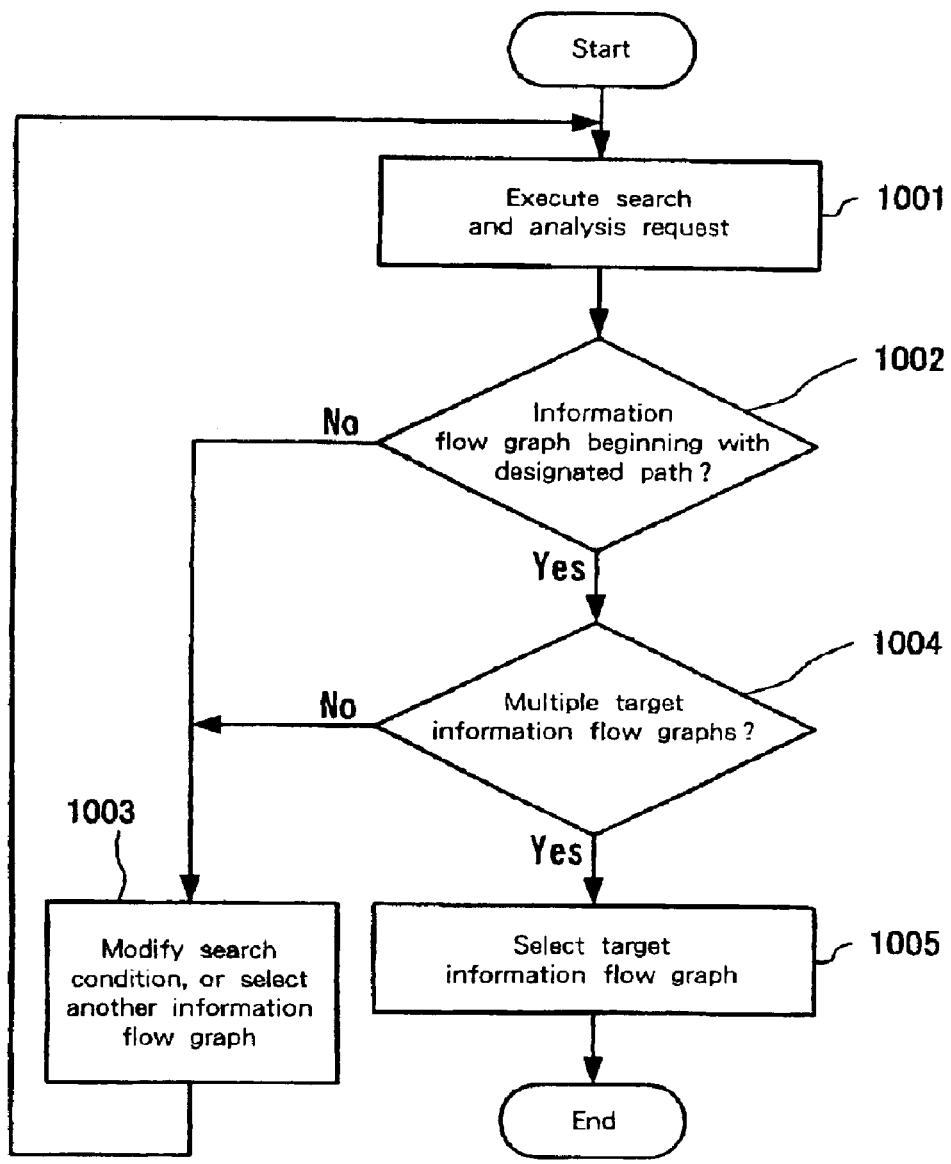
FIG. 10 is a flowchart for explaining the processing for case generation the information flow graph in accordance with the case.

FIG. 10 is a flowchart for explaining the process for case generation from the information flow graph 121 in accordance with the case.

In FIG. 10, upon the receipt of a search request from a user, the information flow graph 121 that begins the designated path (a series of nodes that are connected by one or more arcs), or a second information flow graph that begins with the same path as that of the information flow graph 121 that is selected for processing, is searched for by the knowledge request processor 220 (step 1001). This request is handled by the data knowledge request processor 130 and the information flow graph manager 120, and the information flow graph 121 that satisfies the search request is returned to the knowledge search operation storage unit 223.

If a solution for the search (an information flow graph 121 that matches the search request) is not present, the search condition is modified, or another information flow graph 121 is selected, and the search is performed again (steps 1002 and 1003).

If only one information flow graph 121 that begins with the path designated at step 1001 is present in the solution obtained by the search, again, the search condition is modified or another information flow graph 121 is selected, and a new search is performed (steps 1004 and 1003). In this case, each information flow graph 121 may be evaluated by the data knowledge request processor 130, and the search or analysis results that are actually generated may be confirmed.

When, at step 1004, a plurality of target information flow graphs 121 are found, they are selected. Then, the knowledge synthesis/displaying processor 222 unites the common portions of the information flow graphs 121 using one path, and generates a single information flow graph 121. The newly obtained information flow graph 121 is stored in the information flow graph manager 120 (step 1005).

Correlation of the Information Flow Graph

Figure 11:
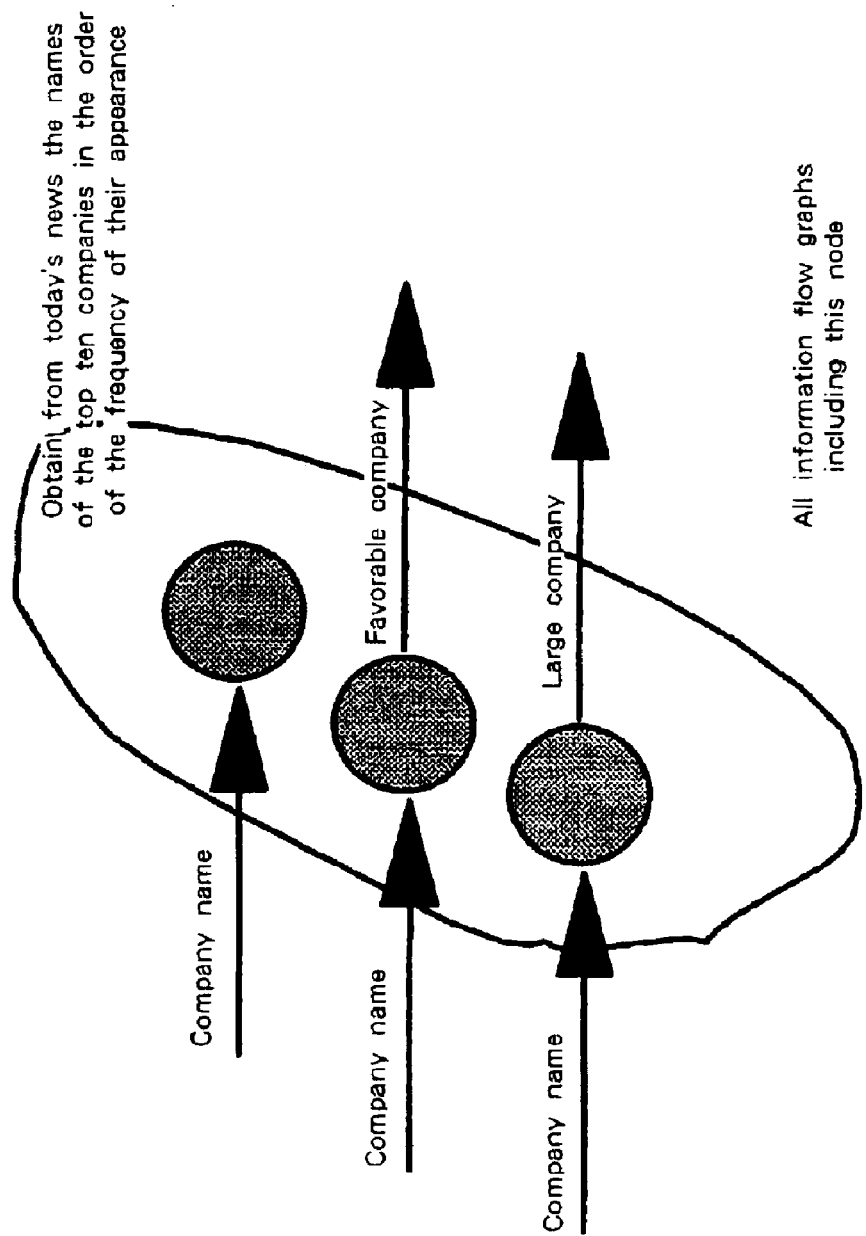
FIG. 11 is a diagram showing the state for the correlation of information flow graphs according to the embodiment.

FIG. 11 is a diagram for explaining the process used for correlating the information flow graphs 121.

In FIG. 11, three information flow graphs having a node that describes "obtaining from today's news the names of the top ten companies in the descending order of their frequency of appearance" are collected at the pertinent node. Therefore, the information flow graphs that are collected at this node as a key include an operation for "obtaining from today's news the names of the top ten companies in the descending order of their frequency of appearance" as a process or as the results obtained by a series of specific operations.

When the user analyzes these information flow graphs, he or she can understand, based on the operation performed for "obtaining from today's news the names of the top ten companies in the descending order of their frequency of appearance", what information search route is present before the information is reached, and what kind of information can be obtained. In addition, the user can combine required (or interesting) information flow graphs to form his or her own information flow graph.

In the example in FIG. 11, multiple information flow graphs are collected at the node that is used in common; however, the information flow graphs may be collected at an arc having the same label, or by using a path consisting of several nodes and arcs, as in the above described case generation.

Figure 12:
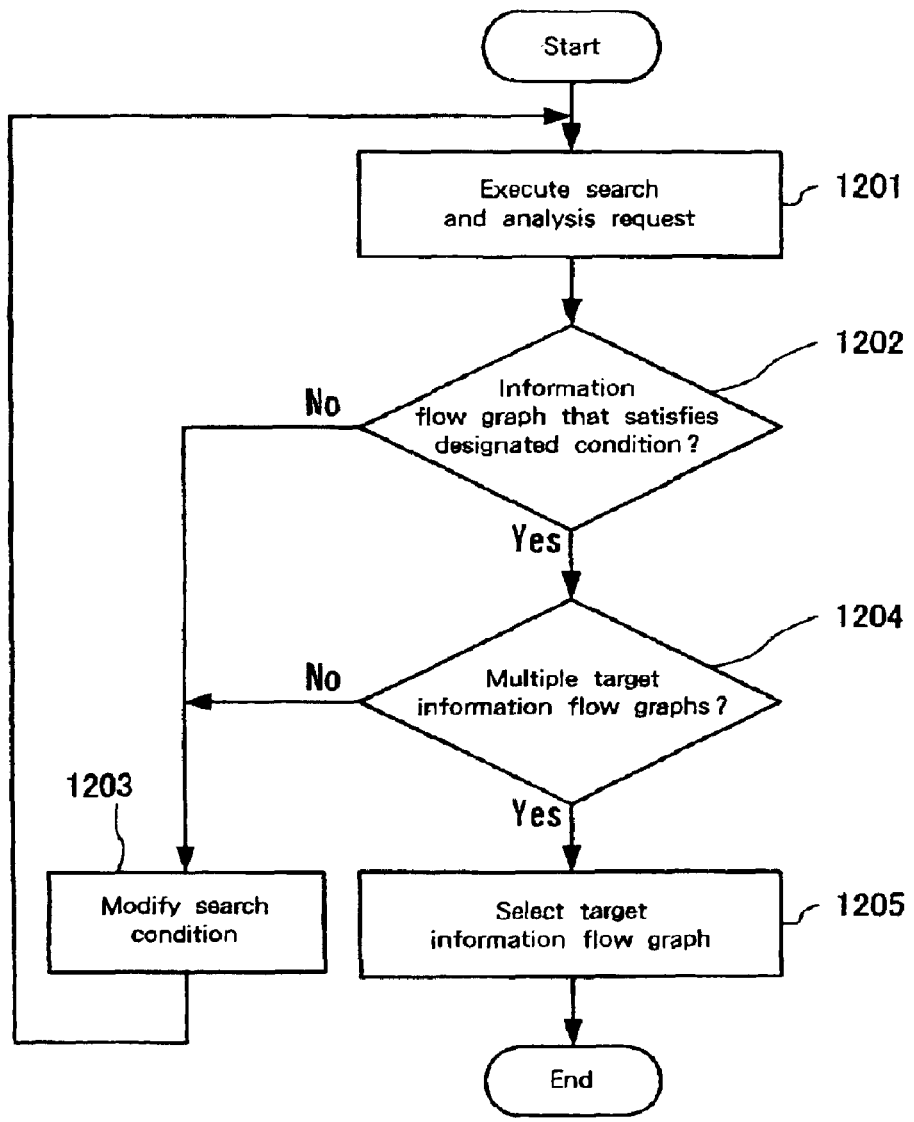
FIG. 12 is a flowchart for explaining the processing for the correlation of the information flow graphs.

FIG. 12 is a flowchart for explaining the processing for correlating the information flow graphs 121.

In FIG. 12, the user issues a search request while designating a desired node or arc, and upon the receipt of this search request, the information flow graph manager 120 searches for all the information flow graphs 121 that include the designated node or arc (step 1201).

If the solution for the search (the information flow graph 121 that satisfies the search request) is not present, the search condition is modified and a new search is performed (steps 1202 and 1203).

If only one information flow graph 121 that includes the node or arc designated at step 1201 is present as the solution, the search condition is also modified and a new search is performed (steps 1204 and 1203).

If, at step 1204, multiple target information flow graphs 121 are found, the user analyzes these information flow graphs 121 and selects a desired graph (step 1205). When the selected information flow graph 121 is stored as the user's information flow graph 121 in the information flow graph manager 120, thereafter, this graph 121 can be used as a guideline for the performance of an operation, can be compared with another information flow graph 121, or can be edited, so as to generate a more detailed graph, or the graph may be generated in accordance with the case.

Through the above processing, the information flow graph control system in this embodiment can describe an operation performed by a user by preparing an information flow graph 121 and storing the information flow graph 121. Thus, the user can employ the information flow graph as a reference when performing the same or a similar operation.

Further, it is easy to compare various operations and to select a more efficient operation, or to obtain an associated operation.

The above described evaluation and processing method for the information flow graph 121 is merely an example, and a common information evaluation or processing method using the graph can also be employed for the information flow graph 121.

When the information flow graph 121 is regarded as one of data forms used by a computer system that implements the information flow graph control system, various information processes using the information flow graph 121 are available. For example, as is described above, the information flow graph 121 can be interpreted as a script for collecting or searching a series of related information. Therefore, the information flow graph control system can read a predetermined information flow graph 121 and automatically perform an operation written in that graph. Furthermore, when the information flow graph 121 is represented as a radar chart according to an appropriate rule, the information collected using the information flow graph 121 can be visualized.

An example application for the information flow graph 121 as a radar chart will now be described.

When the information flow graph 121 is used as a radar chart, it is premised that the data obtained through the operations indicated by the respective nodes of the information flow graph 121 must be correlated with the nodes. The operation items indicated by the respective nodes and the data obtained for the individual items are displayed as a list, together with the radar chart.

Figure 13:
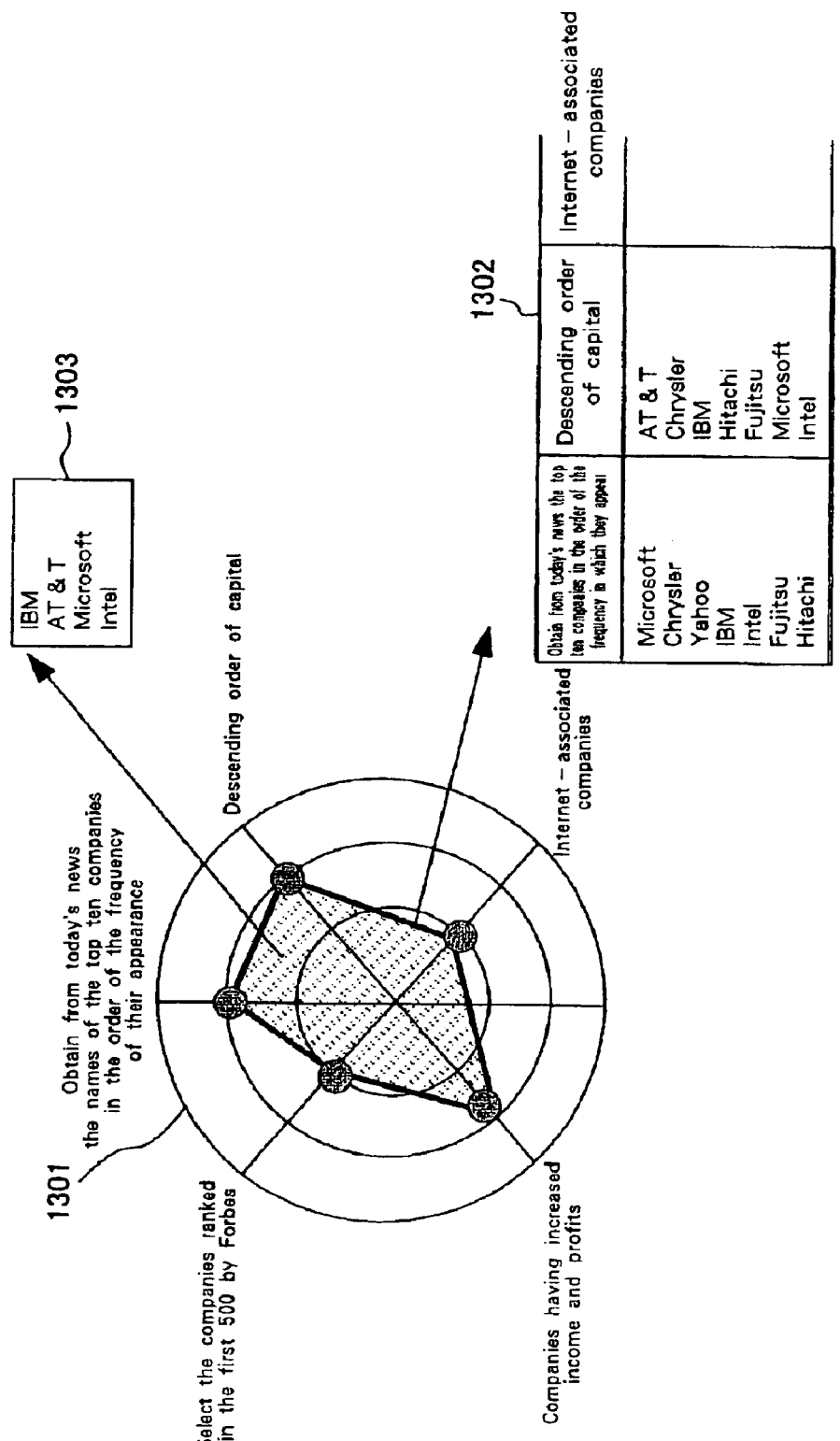
FIG. 13 is a diagram showing a radar chart using an information flow graph and a list of information corresponding to the radar chart that is obtained.

FIG. 13 is a diagram showing a radar chart using the information flow graph 121 and a list of obtained data for the radar chart.

In a radar chart 1301 in FIG. 13, operation items indicated by the individual nodes of the information flow graph 121 are arranged around the circumference of a circle, and conditions for these operations are represented by using the distance from the center of the circle to the circumference. For example, for an item "obtaining from today's news the names of the companies in the descending order of the frequency of their appearance", a condition whereby to ascertain how many companies names are to be obtained can be represented by using the distance from the center of the circle. According to this rule, each node of the information flow graph 121 is arranged at the location of the corresponding condition of the corresponding item. It should be noted that because of the radar cart properties, in the radar chart 1301, the arcs connecting the nodes do not have directions. That is, the order in which operations are executed is not especially considered.

In a list 1302 in FIG. 13, data that satisfies a condition specified by the location of a node is displayed for each item on the radar chart 1301. Further, when the population of the pertinent data are the same, i.e., when the data are obtained from the same database for all the items, a set 1303 of data that satisfy all of these conditions may also be obtained.

As the user interface, not only is the radar chart 1301 displayed, but it can also be used as a GUI operation tool. Specifically, since the location of a node in the radar chart 1301 is correlated with the information obtained through the operation indicated by the pertinent node, an operation, performed after the radar chart 1301 is displayed, whereby the node provided for each corresponding item is slid along the circumference of a circle and the distance from the center of the circle is changed can be correlated with a change in the search condition for the pertinent operation. Thus, the contents of the data presented in the list 1302 can be changed by an interactive and intuitive operation whereby a node on the radar chart 1301 is moved by using a pointing device, such as a mouse.

Further, if the population of the data remain the same, a predetermined node can be fixed, and other nodes can be moved so that the same data as that obtained by an operation that corresponds to the predetermined node is obtained. Then, the shape of the radar chart 1301 that includes this data as the same portion can be examined and evaluated.

Figure 14:
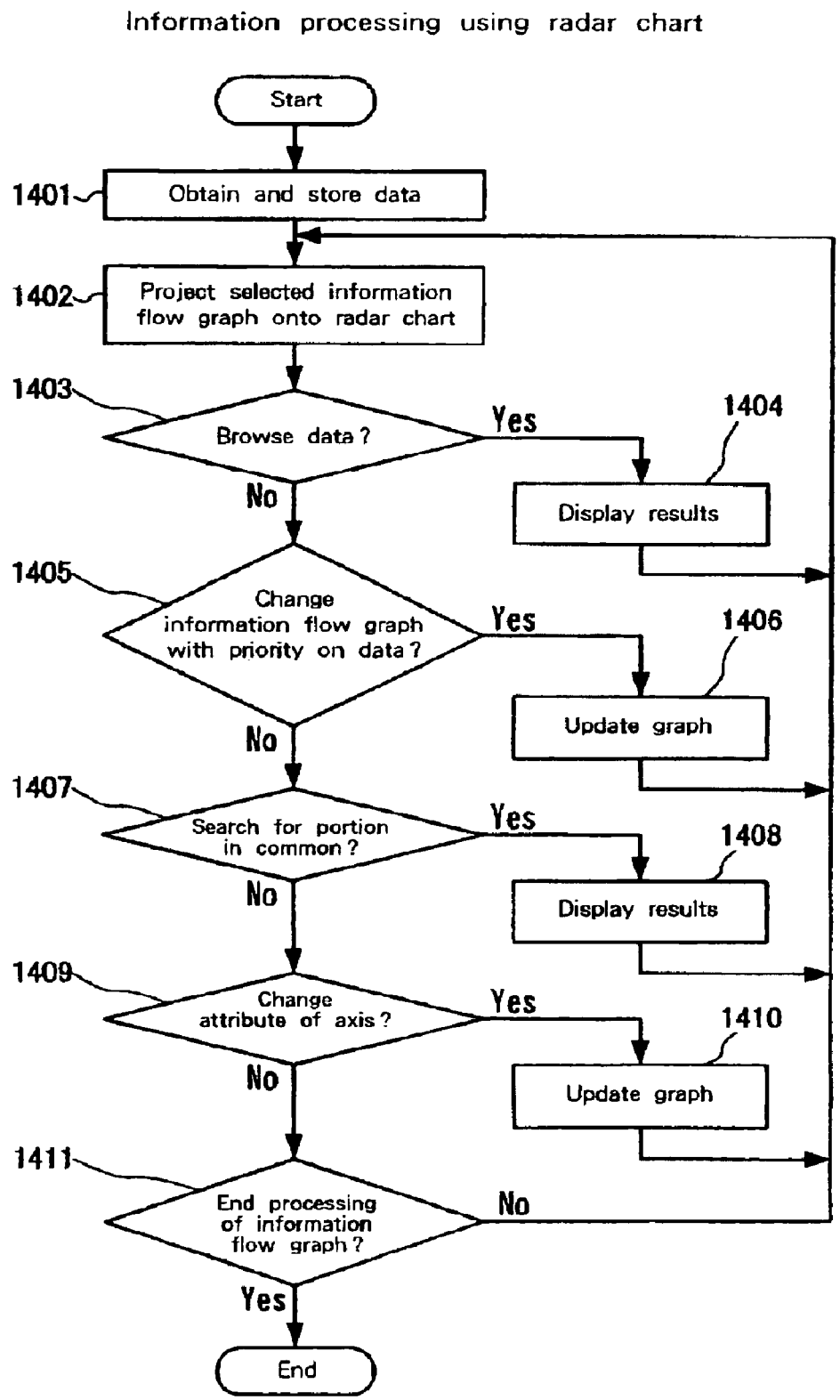
FIG. 14 is a flowchart for explaining the information processing performed using the radar chart according to the embodiment.

FIG. 14 is a flowchart for explaining the information processing performed using the radar chart 1301.

In FIG. 14, first, the data request processor 210 and the data knowledge request processor 130 obtain data sets for corresponding nodes, and store them in the data search operation storage unit 213 (step 1401). Then, the nodes of a selected information flow graph 121 are represented by the knowledge synthesis/display processor 222 using the radar chart 1301 (step 1402).

Thereafter, the user performs a desired operation for the radar chart 1301 on the display. In this example, the user can selectively perform a browsing operation for the data of the individual nodes in the radar chart 1301, an operation for fixing a specific node and correlating the other nodes having like data, an operation for obtaining the same portion in the data for the nodes, and an operation for changing the attribute of the axis that corresponds to the node.

When the browsing of the data is selected, the information flow graph control system transmits a search request for each node to the database manager 110 via the data search processor 211 and the data knowledge request processor 130, and transmits the search results as the list 1302 to the knowledge synthesis/display processor 222, so that the user can see the data corresponding to the respective nodes on the radar chart 1301 (steps 1403 and 1404).

When the user selects an operation for fixing a specific node and correcting other nodes having the same data, the information flow graph control system obtains data correlated with the fixed node from the data request processor 210 and the data search operation storage unit 213. The other nodes in the radar chart 1301 are moved so as to correspond to the search results, and are displayed again (steps 1405 and 1406). When there is a node on the radar chart 1301 that can not be correlated with the selected data, the operation fails (error).

When the user selects an operation for obtaining the same portion in the data for the nodes, the information flow graph control system determines whether the same portion is present in all the data sets that correspond to the nodes on the radar chart 1301. When the same portion is present, the data search processor 211 stores the data set in the data search operation storage unit 213, and the data set for the common portion is displayed by the knowledge synthesis/display processor 222 (steps 1407 and 1408).

When the user selects an operation for changing the attribute of the axis that corresponds to the node (e.g., when corresponding data have multiple attributes, such as a record of an associated database, the attribute of the axis is changed from the number of data sets to the price value set for the data), the information flow graph control system changes the attribute of a target axis in the radar chart 1301, and then correlates the upper and lower ends of the axis with the maximum and minimum available values (for a non-numerical attribute, the values of the first and the last elements that are arranged in proper order). The information for the radar chart 1301 stored in the knowledge search operation storage unit 223 is updated, and the updated radar chart 1301 is again displayed by the knowledge synthesis/display processor 222 (step 1409 and 1410).

Thereafter, to terminate the processing for the information flow graph 121 that is currently being handled, the information flow graph 121 is stored in the information flow graph manager 120. When this is done, the processing can be terminated (step 1411).

As is described above, according to the present invention, an information flow graph can be employed to describe information that is defined by a search form and an action by which information for a specific purpose is collected and analyzed, and new information collection and analysis means for knowledge management can be provided.

According to the present invention, a knowledge expression can be implemented with which it is easy to identify similarities between graphs wherein information and the act of collecting and analyzing it are described, and to re-use a graph that has been prepared.

What is claimed is:

1. An information processing system comprising:

log acquisition means, for obtaining a log for operations performed during information processing;

graph preparation means, for setting, as nodes on a graph, said operations of said log obtained by said log acquisition means, and for connecting said nodes with arcs in the order of the performance of said operations to prepare a graph that represents a transient condition wherein said operations are shifted;

graph editing means, for editing said prepared graph by dividing said graph at an arbitrary location and connecting an arbitrary node to an arbitrary arc, graph storage means, for storing said graph that is prepared;

graph search means, for searching for said graph stored in said graph storage means using, as a search key, an arbitrary node or arc, or a path consisting of a sequence of nodes and arcs, information processing means, for employing said graph as a script, and for mechanically performing operations specified at said nodes of said graph in the order indicated by said arcs in said graph; and graph display means, for visually presenting said graph prepared by said graph preparation means.

2. The information processing system according to claim 1, wherein said graph display means displays said graph detected by said search means.

3. The information processing system according to claim 1, wherein said graph display means displays said graph edited by said graph display means.

4. The information processing system according to claim 1, further comprising:

radar chart preparation means, for arranging operations for information processing around the circumference of a circle and preparing a radar chart that represents conditions for said operations using distances from the center of said circle, and for arranging and displaying said nodes of said graph at predetermined locations on said radar chart; and list preparation means, for preparing a list wherein said nodes on said radar chart are correlated with the results obtained by operations corresponding to said nodes.

5. An information processing method comprising the steps of:

obtaining a log for operations performed during information processing;

setting, as nodes on a graph, said operations recorded in said log, and connecting said nodes with arcs, in the order in which said operations are performed, to prepare a graph representing a transient condition wherein said operations are shifted; and visually presenting said prepared graph;

storing and accumulating graphs that are prepared;

searching for a different graph that includes all or part of a predetermined graph representing a predetermined operating sequence, and that has a node corresponding to a preceding or succeeding operation;

adding, to said predetermined graph, said node that corresponds to said preceding or succeeding operation of the common portion of said different graph, and an arc extended to said node;

storing and accumulating graphs that are prepared;

searching for graphs that correspond to an operating sequence whereby predetermined operating results are available; and selecting a desired graph from among said graphs obtained by the search, and connecting said desired graph to a graph that corresponds to another operation for which the results obtained through an operation consonant with said desired graph are employed.

6. The information processing method according to claim 5, further comprising the step of:

arranging operating items for information processing around the circumference of a circle and preparing a radar chart that represents conditions for said operations using distances from the center of said circle, and arranging and displaying said nodes of said graph at predetermined locations on said radar chart.

7. A computer program which permits a computer to perform:

a process for obtaining a log for operations during information processing;

a process for setting, as nodes on a graph, said operations recorded in said obtained log, and for connecting said nodes with arcs in the order of the performance of said operations to prepare graphs that represent a transient condition wherein said operations are shifted;

a process for accumulating said graphs that are prepared;

a process for searching for a desired graph using, as a search key, an arbitrary node or arc, or a path consisting of a sequence of nodes and arcs;

a process for editing said graph that is prepared or said desired graph that is obtained by the search;

a process for employing said graph as a script, and for mechanically performing operations specified at said nodes of said graph in the order indicated by said arcs in said graph; and a process for visually presenting said graph provided by editing.

8. A storage medium on which input means of a computer stores a computer-readable program that permits a computer to perform:

a process for obtaining a log for operations during information processing;

a process for setting, as nodes on a graph, said operations recorded in said obtained log, and for connecting said nodes with arcs in the order of the performance of said operations to prepare graphs that represent a transient condition wherein said operations are shifted;

a process for accumulating said graphs that are prepared;

a process for searching for a desired graph using, as a search key, an arbitrary node or arc, or a path consisting of a sequence of nodes and arcs;

a process for employing said graph as a script, and for mechanically performing operations specified at said nodes of said graph in the order indicated by said arcs in said graph; and a process for editing said graph that is prepared or said desired graph that is obtained by the search; and a process for visually presenting said graph provided by editing.

9. The storage medium according to claim 8, wherein said program permits said computer to perform:

a process, for arranging operations for information processing around the circumference of a circle and preparing a radar chart that represents conditions for said operations using distances from the center of said circle, and for arranging and displaying said nodes of said graph at predetermined locations on said radar chart.

10. A program transmission apparatus comprising:

storage means for storing a computer-readable program that permits a computer to perform
- a process for obtaining a log for operations during information processing,
- a process for setting, as nodes on a graph, said operations recorded in said obtained log, and for connecting said nodes with arcs in the order of the performance of said operations to prepare graphs that represent a transient condition wherein said operations are shifted,
- a process for accumulating said graphs that are prepared,
- a process for searching for a desired graph using, as a search key, an arbitrary node or arc, or a path consisting of a sequence of nodes and arcs,
- a process for editing said graph that is prepared or said desired graph that is obtained by the search,
- a process, for arranging operations for information processing around the circumference of a circle and preparing a radar chart that represents conditions for said operations using distances from the center of said circle, and for arranging and displaying said nodes of said graph at predetermined locations on said radar chart; and
- a process for visually presenting said graph provided by editing; and transmission means for reading said computer-readable program from the storage means and transmitting said computer-readable program.

11. An information processing system comprising:

log acquisition means, for obtaining a log for operations performed during information processing;

graph preparation means, for setting, as nodes on a graph, said operations of said log obtained by said log acquisition means, and for connecting said nodes with arcs in the order of the performance of said operations to prepare a graph that represents a transient condition wherein said operations are shifted; and graph editing means, for editing said prepared graph by dividing said graph at an arbitrary location and connecting an arbitrary node to an arbitrary arc, graph storage means, for storing said graph that is prepared;

graph search means, for searching for said graph stored in said graph storage means using, as a search key, an arbitrary node or arc, or a path consisting of a sequence of nodes and arcs, information processing means, for employing said graph as a script, and for mechanically performing operations specified at said nodes of said graph in the order indicated by said arcs in said graph;

radar chart preparation means, for arranging operations for information processing around the circumference of a circle and preparing a radar chart that represents conditions for said operations using distances from the center of said circle, and for arranging and displaying said nodes of said graph at predetermined locations on said radar chart; and list preparation means, for preparing a list wherein said nodes on said radar chart are correlated with the results obtained by operations corresponding to said nodes; and graph display means, for visually presenting said graph.

12. A storage medium on which input means of a computer stores a computer-readable program that permits a computer to perform:

a process for obtaining a log for operations during information processing;

a process for setting, as nodes on a graph, said operations recorded in said obtained log, and for connecting said nodes with arcs in the order of the performance of said operations to prepare graphs that represent a transient condition wherein said operations are shifted;

a process for accumulating said graphs that are prepared;

a process for searching for a desired graph using, as a search key, an arbitrary node or arc, or a path consisting of a sequence of nodes and arcs;

a process for employing said graph as a script, and for mechanically performing operations specified at said nodes of said graph in the order indicated by said arcs in said graph;

a process for editing said graph that is prepared or said desired graph that is obtained by the search; and a process for visually presenting said graph provided by editing and a process, for arranging operations for information processing around the circumference of a circle and preparing a radar chart that represents conditions for said operations using distances from the center of said circle, and for arranging and displaying said nodes of said graph at predetermined locations on said radar chart.

* * * * *